US007063311B1

(12) United States Patent
Ascolese

(10) Patent No.: US 7,063,311 B1
(45) Date of Patent: Jun. 20, 2006

(54) PORTABLE FIBER OPTIC WORKSTATION ASSEMBLY

(76) Inventor: Donald C. Ascolese, 912 Madison St., Coatesville, PA (US) 19320

( * ) Notice: Subject to any disclaimer, the term of this patent is extended or adjusted under 35 U.S.C. 154(b) by 159 days.

(21) Appl. No.: 10/815,075

(22) Filed: Apr. 1, 2004

(51) Int. Cl.
*B23Q 1/25* (2006.01)

(52) U.S. Cl. .......................................... 269/69; 269/71

(58) Field of Classification Search .................. 269/69, 269/17, 139, 95, 71
See application file for complete search history.

(56) References Cited

U.S. PATENT DOCUMENTS 4,145,006 A * 3/1979 Webb .......................... 269/69
4,287,622 A * 9/1981 Lane .......................... 5/505.1
4,576,395 A 3/1986 Longoria
4,660,814 A * 4/1987 Shader et al. ................. 269/16
5,082,037 A 1/1992 Hammons et al.
5,121,697 A 6/1992 Baum et al.
5,435,412 A 7/1995 Franklin, III et al.
6,010,016 A * 1/2000 Siegal ..................... 211/126.1
6,240,856 B1 6/2001 Paskey et al.
6,749,189 B1 * 6/2004 Wolff et al. ................. 269/139
2002/0150370 A1 10/2002 Battey et al.

* cited by examiner

*Primary Examiner*—Lee D. Wilson

(57) ABSTRACT

A portable fiber optic workstation assembly includes a base. A bracket is attached to and extends upwardly from the base. A post has a bottom end and an upper end. The bracket is adapted for releasably attaching the bottom end of the post to the base such that the post extends upwardly from the base. A frame has a front wall, a rear wall, a first lateral wall, a second lateral wall, a top surface and a bottom surface, a mesh screen is attached to and extending across an interior of the frame, the mesh screen is generally flush with the top surface. A hinge hingedly couples the frame to the post such that the bottom surface of the rear wall may be abutted against the upper end such that a plane of the frame is orientated generally perpendicular to a longitudinal axis of the post.

12 Claims, 5 Drawing Sheets

PORTABLE FIBER OPTIC WORKSTATION ASSEMBLY

BACKGROUND OF THE INVENTION

1. Field of the Invention

The present invention relates to workstation devices and more particularly pertains to a new workstation device for providing a stable and portable surface for working on fiber optic cable.

2. Description of the Prior Art

The use of workstation devices is known in the prior art. U.S. Patent Application 2002/015370 describes a device that includes a plurality of fiber optic cable receiving troughs so that the cables may be held in a manner that keeps them separate from each other. Another type of workstation device is U.S. Pat. No. 5,435,412 which holds fiber optic cable in a position adjacent to a point where it is to be spliced. A similar device is found in U.S. Pat. No. 5,082,037 which describes a panel that is adapted for holding a plurality of tools.

While these devices fulfill their respective, particular objectives and requirements, the need remains for a device that provides a stable workstation for a person who is working with fiber optic cables. Additionally, the device should be portable and mountable in a variety of situations to ensure that the device is useful in the field at a variety of work sites.

SUMMARY OF THE INVENTION

The present invention meets the needs presented above by generally comprising a base and a bracket is attached to and extends upwardly from the base. A post has a bottom end and an upper end. The bracket is adapted for releasably attaching the bottom end of the post to the base such that the post extends upwardly from the base. A frame has a front wall, a rear wall, a first lateral wall, a second lateral wall, a top surface and a bottom surface, a mesh screen is attached to and extending across an interior of the frame, the mesh screen is generally flush with the top surface. The mesh screen is substantially rigid. A hinge hingedly couples the frame to the post such that the bottom surface of the rear wall may be abutted against the upper end and that a plane of the frame is orientated generally perpendicular to a longitudinal axis of the post.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
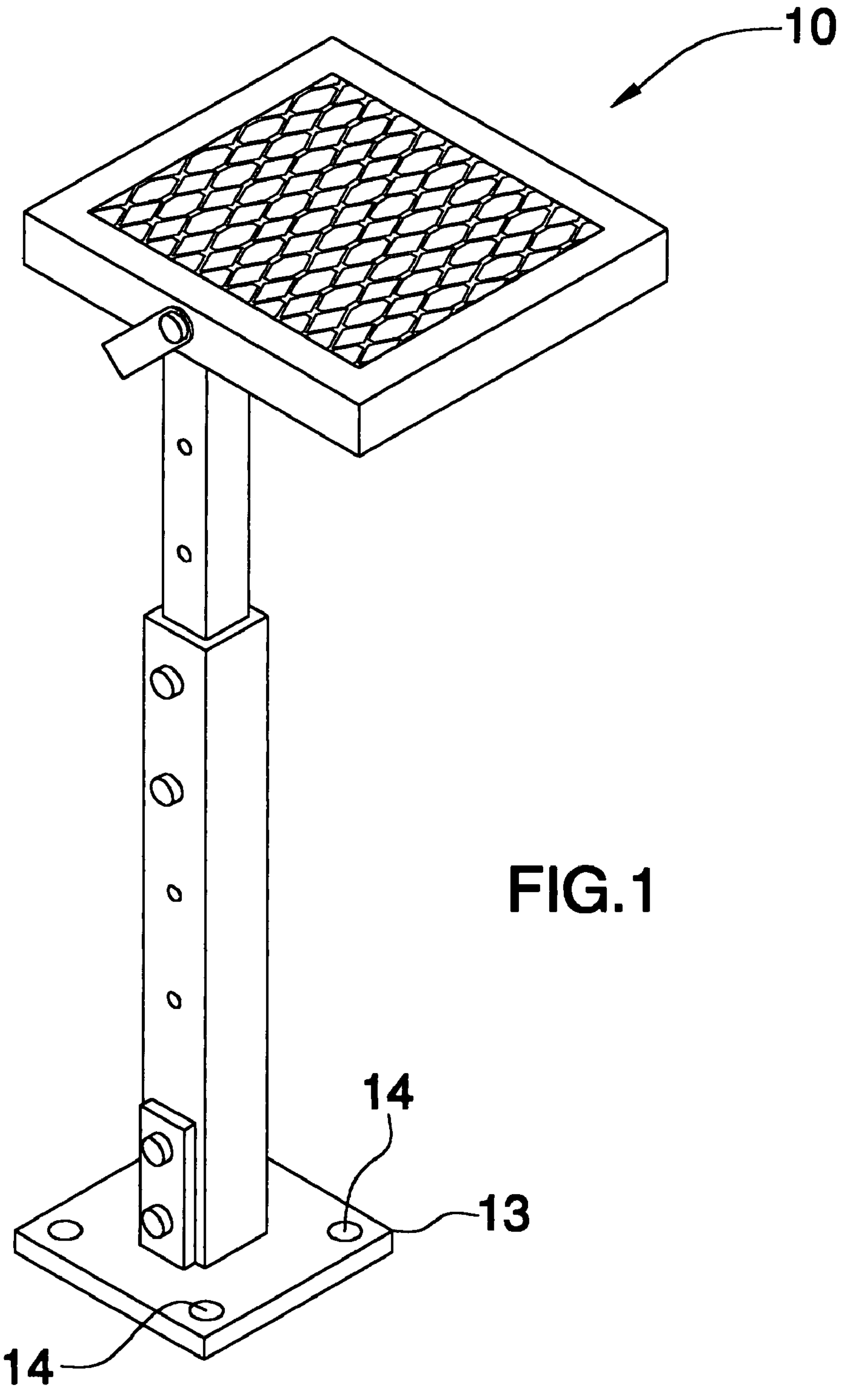
FIG. 1 is a perspective view of a portable fiber optic workstation assembly according to the present invention.
Figure 2:
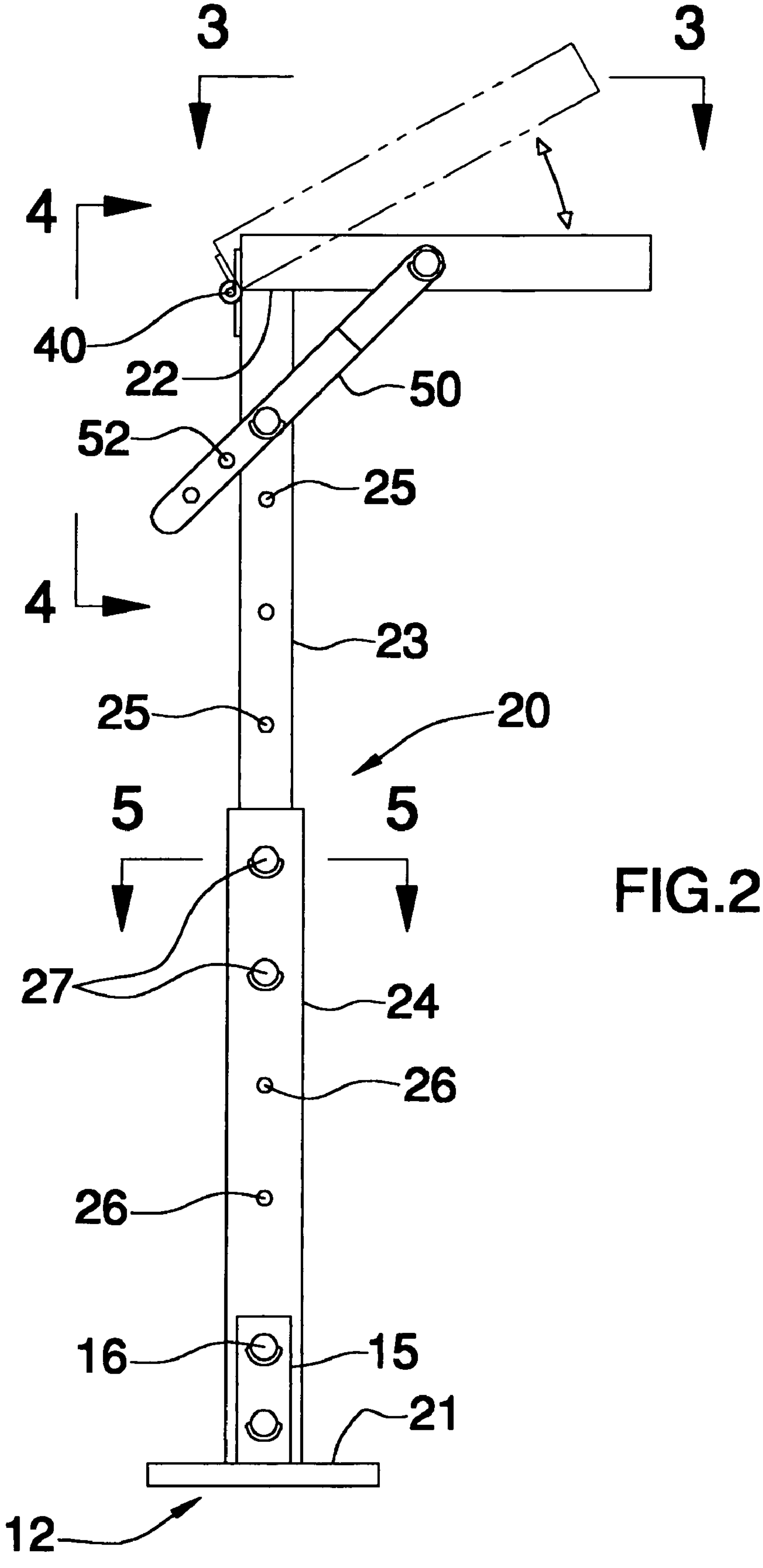
FIG. 2 is a side view of the present invention.
Figure 3:
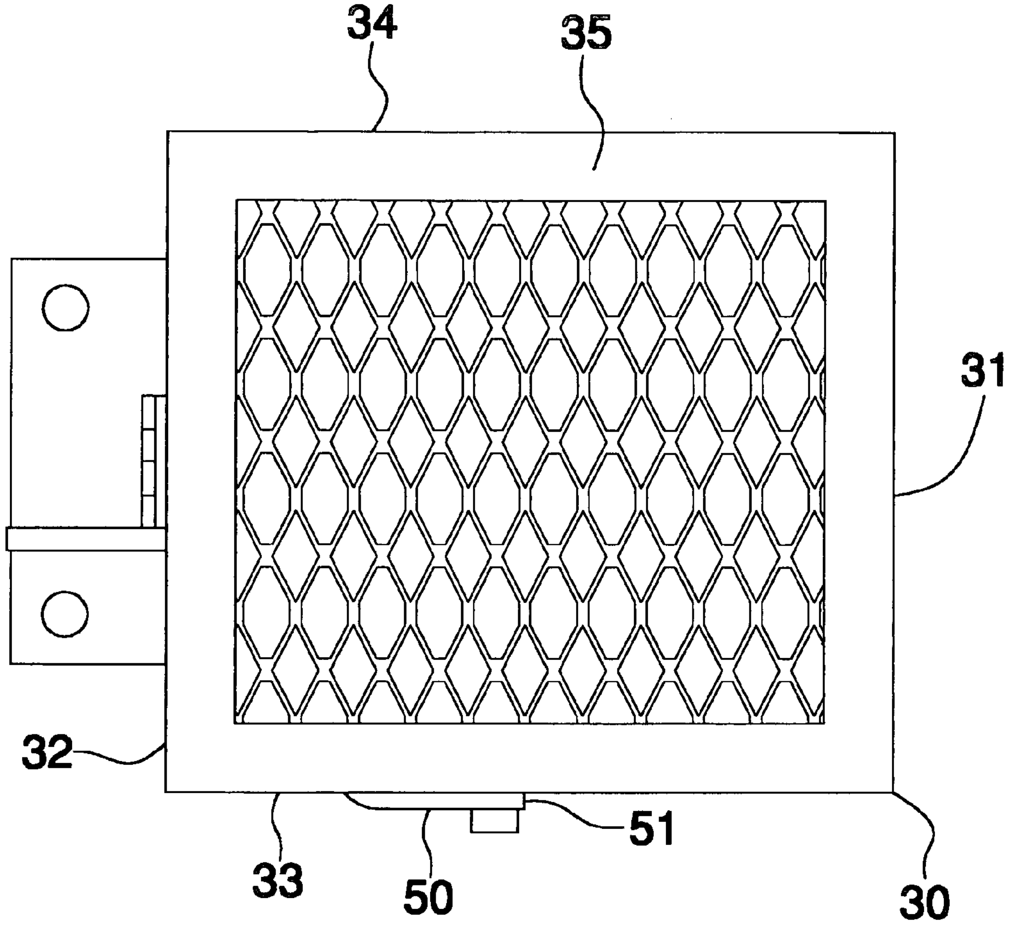
FIG. 3 is a top view of the present invention.
Figure 4:
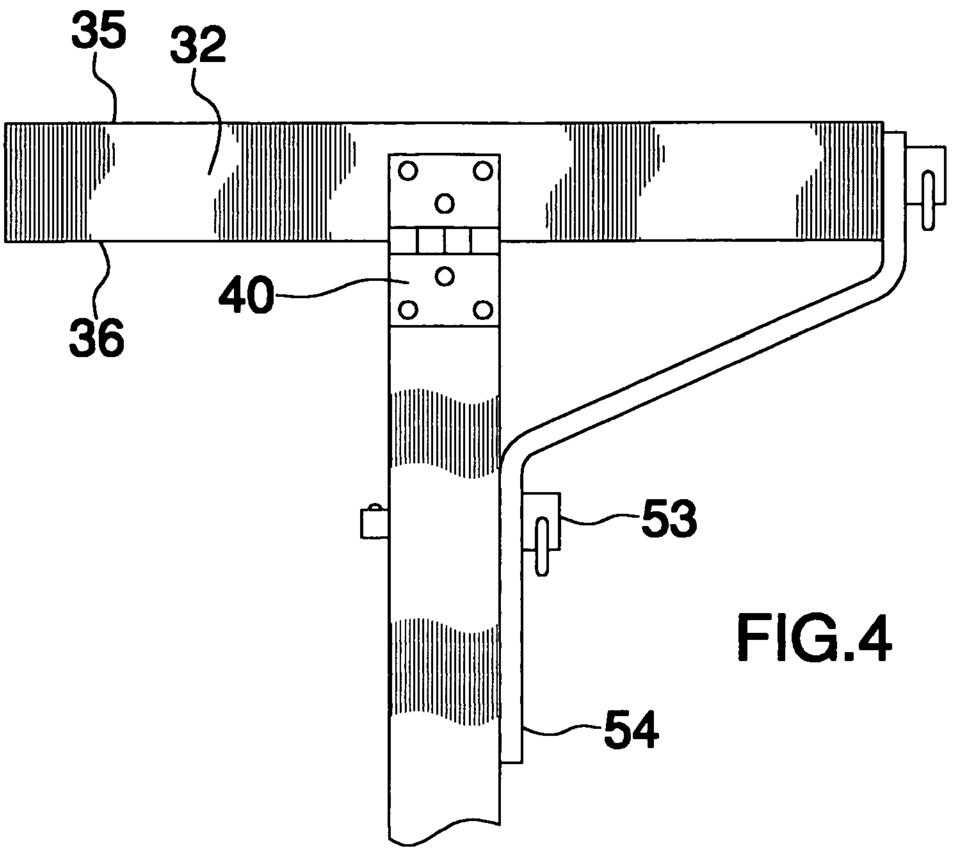
FIG. 4 is a back view of the present invention.
Figure 5:
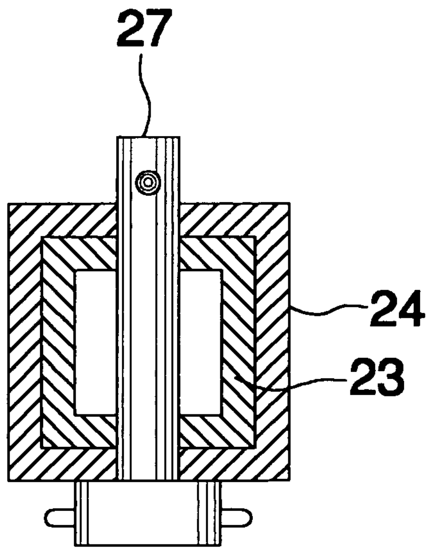
FIG. 5 is a cross-sectional view taken along line 5—5 of FIG. 2 of the present invention.
Figure 7:
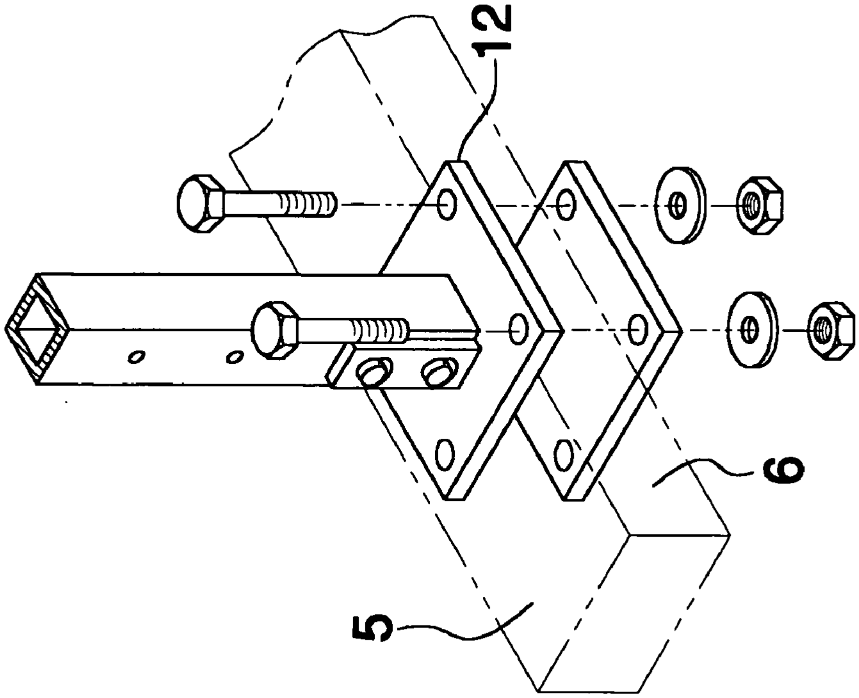
FIG. 7 is a perspective view of the present invention.
Figure 6:
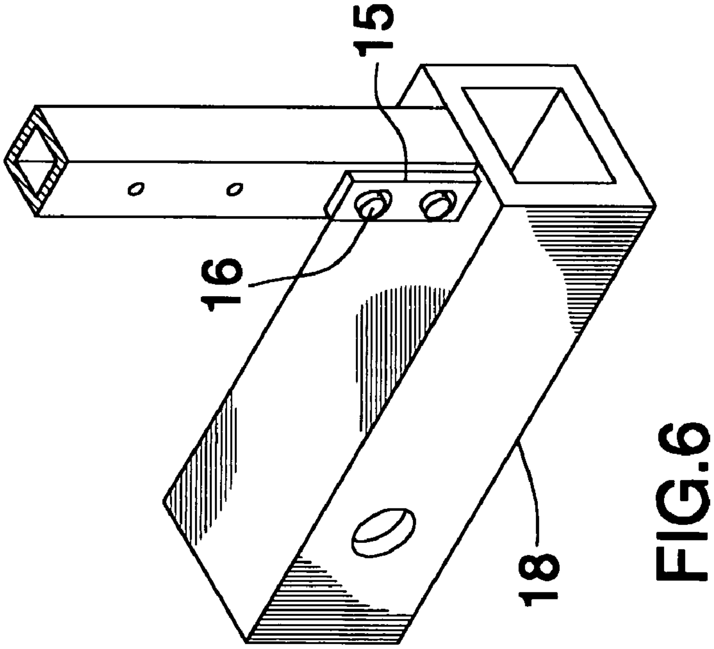
FIG. 6 is a perspective view of secondary base of the present invention.

With reference now to the drawings, and in particular to FIGS. 1 through 7 thereof, a new workstation device embodying the principles and concepts of the present invention and generally designated by the reference numeral 10 will be described.

As best illustrated in FIGS. 1 through 7, the portable fiber optic workstation assembly 10 generally includes a base 12 that comprises a plate 13 having a generally rectangular shape. The plate 13 has a plurality of holes 14 extending therethrough. The holes 14 allow a user to mount the plate to a horizontal surface 5 or to an edge of a bench 6. A bracket 15 is attached to and extends upwardly from the base 12. The bracket 15 includes at least one vertical plate integrally coupled to the base 12. The plate, or bracket, is adapted for receiving securing members 16. Alternatively, a secondary base may incorporate a male trailer hitch 18 that is adapted for extending into a trailer hitch receiver. The mail trail hitch 18 would also include a bracket 15.

A post 20 has a bottom end 21 and an upper end 22. The bracket 15 is adapted for releasably attaching the bottom end 21 of the post 20 to the base 12 such that the post 20 extends upwardly from the base 12. In particular, the securing members 16 are extended through the plate 15 and into the post 20. The post 20 is telescoping and includes a first portion 23 that is selectively extendable outwardly of a second portion 24. The first portion 23 has a first set of apertures 25 extending therethrough and along a length of the first portion 23. The second portion 24 has a second set of apertures 26 extending therethrough and along a length of the second portion 24. The securing members 16 may be extended through the second set of apertures 26 adjacent to the bottom end 21. The first set of apertures 25 may be selectively aligned with the second set of apertures 26. Each of the first 23 and second 24 portions has a height generally between 22 inches and 26 inches. At least one pin 27 is removably extendable through aligned ones of the first 25 and second 26 sets of apertures. The pin 27 secures the first 23 and second 24 portions in at selected height. Two pins 27 may be used for increasing the stability of the post 20.

A frame 30 has a front wall 31, a rear wall 32, a first lateral wall 33, a second lateral wall 34, a top surface 35 and a bottom surface 36. A mesh screen 37 is attached to and extends across an interior of the frame 30. The mesh screen 37 is generally flush with the top surface 35 and is substantially rigid. The rigid nature may come from the material of the mesh screen 37 which is preferably plastic or metal, or may be due to a more flexible material which is pulled tight on the frame. The frame 30 has a width generally between 5 inches and 7 inches and a length generally between 5 inches and 7 inches.

A hinge 40 hingedly couples the frame 30 to the post 20 such that the bottom surface 36 of the rear wall 32 may be abutted against the upper end 22 and a plane of the frame 30 is orientated generally perpendicular to a longitudinal axis of the post 20. This places the frame 30 in a generally horizontal position when the post 20 is attached to the bracket 15.

A support arm 50 has a first end 51 pivotally attached to the first lateral wall 33 of the frame 30. The support arm 50 has a plurality of openings 52 extending therethrough. A fastener 53 is removably extendable through one of the openings 52 and an uppermost one of the first set of apertures 25. Extending the fastener 53 through different ones of the openings 52 allows a user of the assembly 10 to selectively choose an angle of the frame 30 with respect to the post 20. By moving extending the fastener 53 through openings nearer a free end 54 of the support arm 50, the frame 30 is angled upwardly.

In use, the post 20 is attached to a base 12, 18 that is either mounted to a horizontal surface 5 or extended into a receiving hitch, though the plate 13 may be used by itself to support the post 20 in a vertical orientation. Fiber optic cable may be attached to the frame 30 with clamps or cords so that the fiber optic cable may be worked on in a stabilized setting. The base 12, 18 allows the assembly to be moved to worksite as needed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable work platform assembly for providing a cable splicing workstation, said assembly including:

a base;

a bracket being attached to and extending upwardly from said base;

a post having a bottom end and an upper end, said bracket being adapted for releasably attaching said bottom end of said post to said base such that said post extends upwardly from said base, said post being telescoping and including a first portion being selectively extendable outwardly of a second portion, said first portion having a first set of apertures extending therethrough, said second portion having a second set of apertures extending therethrough, wherein said first set of apertures may be selectively aligned with said second set of apertures at least one pin being removably extendable through aligned ones of said first and second sets of apertures;

a frame having a front wall, a rear wall, a first lateral wall, a second lateral wall, a top surface and a bottom surface, a mesh screen being attached to and extending across an interior of said frame, said mesh screen being generally flush with said top surface, said mesh screen being substantially rigid; and a hinge hingedly coupling said frame to said post such that said bottom surface of said rear wall may be abutted against said upper end and a plane of said frame is orientated generally perpendicular to a longitudinal axis of said post.

2. The assembly according to claim 1, wherein said base comprises a plate having a generally rectangular shape, said plate having a plurality of holes extending therethrough.

3. The assembly according to claim 1, wherein said base comprises a male trailer hitch.

4. The assembly according to claim 1, wherein each of said first and second portions has a height generally between 22 inches and 26 inches.

5. The assembly according to claim 1, wherein said frame has a width generally between 5 inches and 7 inches and a length generally between 5 inches and 7 inches.

6. The assembly according to claim 1, further including a support arm having a first end pivotally attached to said frame, said support arm having a plurality of openings extending therethrough, a fastener being removably extendable through one of said openings and an uppermost one of said first set of apertures, wherein an angle of said frame with respect to said post may be selectively chosen by extending said fastener through different ones of said openings.

7. A portable work platform assembly for providing a cable splicing workstation, said assembly including:

a base, said base comprising a plate having a generally rectangular shape, said plate having a plurality of holes extending therethrough;

a bracket being attached to and extending upwardly from said base;

a post having a bottom end and an upper end, said bracket being adapted for releasably attaching said bottom end of said post to said base such that said post extends upwardly from said base, said post being telescoping and including a first portion being selectively extendable outwardly of a second portion, said first portion having a first set of apertures extending therethrough, said second portion having a second set of apertures extending therethrough, wherein said first set of apertures may be selectively aligned with said second set of apertures, each of said first and second portions having a height generally between 22 inches and 26 inches;

at least one pin being removably extendable through aligned ones of said first and second sets of apertures;

a frame having a front wall, a rear wall, a first lateral wall, a second lateral wall, a top surface and a bottom surface, a mesh screen being attached to and extending across an interior of said frame, said mesh screen being generally flush with said top surface, said mesh screen being substantially rigid, said frame having a width generally between 5 inches and 7 inches and a length generally between 5 inches and 7 inches;

a hinge hingedly coupling said frame to said post such that said bottom surface of said rear wall may be abutted against said upper end and a plane of said frame is orientated generally perpendicular to a longitudinal axis of said post; and a support arm having a first end pivotally attached to said frame, said support arm having a plurality of openings extending therethrough, a fastener being removably extendable through one of said openings and an uppermost one of said first set of apertures, wherein an angle of said frame with respect to said post may be selectively chosen by extending said fastener through different ones of said openings.

8. A portable work platform assembly for providing a cable splicing workstation, said assembly including:

a base;

a bracket being attached to and extending upwardly from said base;

a post having a bottom end and an upper end, said bracket being adapted for releasably attaching said bottom end of said post to said base such that said post extends upwardly from said base;

a frame having a front wall, a rear wall, a first lateral wall, a second lateral wall, a top surface and a bottom surface, a mesh screen being attached to and extending across an interior of said frame, said mesh screen being generally flush with said top surface, said mesh screen being substantially rigid;

a hinge hingedly coupling said frame to said post such that said bottom surface of said rear wall may be abutted against said upper end and a plane of said frame is orientated generally perpendicular to a longitudinal axis of said post; and a support arm having a first end pivotally attached to said frame, said support arm having a plurality of openings extending therethrough, a fastener being removably extendable through one of said openings and an uppermost one of said first set of apertures, wherein an angle of said frame with respect to said post may be selectively chosen by extending said fastener through different ones of said openings.

9. The assembly according to claim 8, wherein said post is telescoping and includes a first portion being selectively extendable outwardly of a second portion, said first portion having a first set of apertures extending therethrough, said second portion having a second set of apertures extending therethrough, wherein said first set of apertures may be selectively aligned with said second set of apertures, at least one pin being removably extendable through aligned ones of said first and second sets of apertures.

10. The assembly according to claim 9, wherein each of said first and second portions has a height generally between 22 inches and 26 inches.

11. The assembly according to claim 8, wherein said frame has a width generally between 5 inches and 7 inches and a length generally between 5 inches and 7 inches.

12. The assembly according to claim 8, wherein said base comprises a male trailer hitch.

* * * * *